United States Patent [19]

Baurmeister et al.

[11] Patent Number: 4,668,396
[45] Date of Patent: May 26, 1987

[54] DIALYSIS MEMBRANE OF MODIFIED CELLULOSE WITH IMPROVED BIOCOMPATIBILITY

[75] Inventors: Ulrich Baurmeister, Berlin; Walter Brodowski, Amorbach; Michael Diamantoglou, Erlenbach; Gustav Dunweg, Wuppertal; Werner Henne, Wuppertal; Michael Pelger, Wuppertal; Helmut Schulze, Wuppertal, all of Fed. Rep. of Germany

[73] Assignee: Akzo NV, Netherlands

[21] Appl. No.: 765,530

[22] Filed: Aug. 14, 1985

[30] Foreign Application Priority Data

Aug. 18, 1984 [DE] Fed. Rep. of Germany ....... 3430503
Jul. 10, 1985 [DE] Fed. Rep. of Germany ....... 3524596

[51] Int. Cl.$^4$ .............................................. B01D 13/00
[52] U.S. Cl. ................................. 210/500.29; 210/655
[58] Field of Search ...................... 210/490, 500.2, 655, 210/500.30, 500.29, 500.31, 500.32; 106/122, 167, 197.2; 536/84; 604/374

[56] References Cited

U.S. PATENT DOCUMENTS 3,962,212  6/1976  Sano et al. .................... 210/500.2 X
4,051,040  9/1977  Hazdra et al. ................ 210/500.2 X
4,253,963  3/1981  Franken et al. .................. 210/500.2
4,276,172  6/1981  Henne et al. ......................... 210/490

FOREIGN PATENT DOCUMENTS 2300496  7/1973  Fed. Rep. of Germany .

OTHER PUBLICATIONS

Complement Activation during Hemodialysis: Clinial Observations, Proposed Mechanisms, and Theoretical Implications; Dennis E. Chenoweth, vol. 8, Nov. 3, 1984, pp. 281–287.

*Primary Examiner*—Frank Spear
*Attorney, Agent, or Firm*—Parkhurst & Oliff

[57] ABSTRACT

A dialysis membrane used for hemodialysis having a structure comprised of flat films, blown films or tubular threads of substitution-modified cellulose, in which the effects of complement activation and leukopenia are clearly reduced. The average degree of substitution of the modified cellulose is 0.02 to 0.07. Dialysis membranes, which have proven successful within the scope of the invention, contain modified cellulose, having a structure represented by the formula cellulose-Z, wherein Z represents the group —R'—X—Y.

X is at least one member selected from the group consisting of

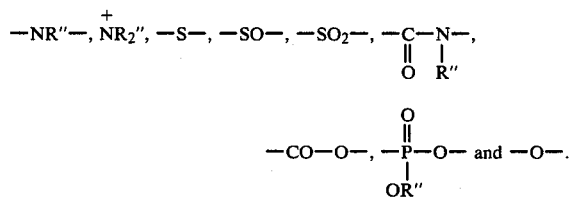

Y is at least one member selected from the group consisting of —R, —NR$_2$, —Si(OR")$_3$, —SO$_3$H, —COOH, —PO$_3$H$_2$, —N$^+$HR$_2$, —OR" and the salts thereof.

R' is at least one member selected from the group consisting of an alkylenes cycloalkylenes and arylenes having a total of 1 to 25 carbon atoms.

R" is a hydrogen atom or R.

R is at least one member selected from the group consisting of an alkyls with 1 to 5 carbon atoms, cycloalkyls and an aryls.

7 Claims, 2 Drawing Figures

DIALYSIS MEMBRANE OF MODIFIED CELLULOSE WITH IMPROVED BIOCOMPATIBILITY

The invention relates to a dialysis membrane for hemodialysis in the form of flat films, blown films or tubular threads of substitution-modified cellulose.

BACKGROUND OF THE INVENTION

Dialysis membranes of cellulose for hemodialysis in the form of flat films, blown films or tubular threads have been known for some time and are the preferred materials for artificial kidneys. However, properties causing some unwanted side effects have not yet been eliminated.

A dialysis membrane for hemodialysis with reduced thrombogenic activity of cellulose with antithrombogenic compounds chemically bound thereto is known from West German No. 27 05 735, in which the dialysis membrane consists of two or more layers of a cellulose regenerated from cuoxam cellulose solutions. The two or more layers are obtained from separately supplied slits of a spinning nozzle or spinneret, wherein the cellulose layer adjacent the blood side consists entirely or partially of modified cellulose containing chemically bound anti-thrombogenic substances.

Further proposed in West German Laid-open Application No. 17 20 087, to reduce the dangers of blood coagulation, is reacting the polymer material of the membrane with an alkyl halide, then reacting the resulting material with an alkali salt of an antithrombogenic compound with cationic residue (e.g., heparin or a heparinoid compound). The possible alkyl halides include halogen alkyldialkylamines. Cellulose, primarily cellulose acetate, are among the possible polymers used for the membrane.

However, any antithrombogenic action of these known dialysis membranes is observed only if the degree of substitution of the modified cellulose is high (i.e., greater than at least 0.1) and a preliminary heparinization is carried out in a separate step with relatively high heparin concentrations (0.1 to 1 wt.% solutions).

Besides the fact that dialysis membranes made of synthetic or natural polymers, when used in artificial kidneys, can easily cause blood coagulation, which in turn is largely prevented by appropriate drug treatment, an additional problem often occurs with the dialysis membranes of regenerated cellulose, which heretofore could not be solved satisfactorily.

It has been demonstrated, for example, that a transient decrease in the number of leukocytes, known as leukopenia, can occur initially in dialysis treatment, when treating a kidney patient with regenerated cellulose-membrane dialyzers. Leukopenia denotes a decreased production of leukocytes (white blood cells) in the blood circulation. The average number of leukocytes (white blood cells) in humans is approximately 4000 to 12,000 cells/mm$^3$. Leukopenia during dialysis is most prevalent 15 to 20 min after initiation of the treatment time, during which time neutrophils (i.e., leukocytes stainable with neutral or concurrently with acidic and basic dyes) can almost totally disappear. The leukocyte count gradually recovers within about an hour, to the initial value or possibly higher. If a new dialyzer is connected after the recovery of leukocytes, leukopenia, to a similar degree, will recur.

Cellulose membranes are responsible for noticeable leukopenia effects, and even if the clinical significance of the leukopenia has not been scientifically explained, there is the desire to design a dialysis membrane for hemodialysis which does not exhibit the leukopenia effect, without thereby affecting the other very desirable properties of dialysis membranes of regenerated cellulose.

In addition to leukopenia, noticeable complement activation has also been found to exist, in hemodialysis with membranes of regenerated cellulose. The complement system within the blood serum is a complex system of plasma enzymes, consisting of many components, which in various ways serve as defenses against injury caused by invading foreign cells (bacteria, etc.). If antibodies for attacking the invading organism are present, they can be activated complement-specifically via the antibody complex by antigenic structures found on foreign cells. In other cases, the activation of complements occurs via an alternate route by the specific surface features of the foreign cells. The system of complements is based on a multitude of plasma proteins. Following activation, these proteins interact in a specific order of sequence and in the end a cellulotoxic complex is formed that destroys the foreign cell.

Peptides, which induce inflammation symptons and occasionally may also have undesirable pathological consequences for the body, are released from separate components. It is assumed that the activation in the case of hemodialysis membranes of regenerated cellulose occurs via the alternate route.

Objectively, these complement activations can be shown to exist by finding the complement fragments C3a and C5a. The following reports are cited within this context: D. E. Chenoweth et al., Kidney International Vol. 24, pp. 764 ff, 1983, and D. E. Chenoweth, Asaio-Journal Vol. 7, pp. 44 ff, 1984.

Although the clinical significance of complement activation has not been explained, efforts have been made to eliminate the same in hemodialysis as much as possible.

These three factors, blood coagulation, leukopenia and complement activation are currently regarded as the three most critical parameters for biocompatibility of dialysis membranes. It is, therefore, the object of the present invention to make available a dialysis membrane, which clearly reduces the effects of complement activation and leukopenia, while simultaneously retaining the relatively beneficial properties of the cellulose membrane regarding blood coagulation.

DETAILED DESCRIPTION OF THE INVENTION

It has been shown that a dialysis membrane for hemodialysis in the form of flat films, blown films or tubular threads of substitution-modified cellulose, resolves the problem described hereinabove, if the average degree of substitution of the modified cellulose, in such a dialysis membrane, is in the narrow range of 0.02 to 0.07.

The degree of substitution of the substitution-modified cellulose is defined as the average number of substituents per 1 glucose anhydride unit of the membrane-forming cellulose.

The desired average degree of substitution can be achieved by direct mixing of the proper proportions for the substitution, by blending differently substituted cellulose or substituting with nonsubstituted cellulose. Suitable substitution-modified celluloses are esterified or etherified celluloses. Etherified celluloses are preferred.

The dialysis membranes, which have proven successful within the scope of the present invention, contain modified cellulose, which has the structure represented by the formula cellulose-Z, wherein Z is the group —R'—X—Y and wherein:

X is at least one member selected from the group consisting of

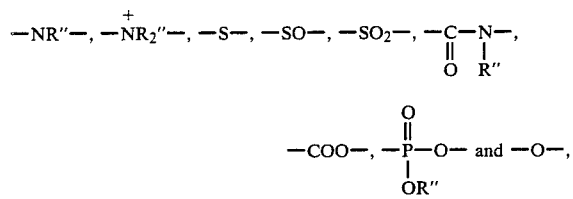

Y is at least one member selected from the group consisting of —R, —NR$_2$, —Si(OR")$_3$, —SO$_3$H, —COOH, —PO$_3$H$_2$, —N+HR$_2$, —OR" and salts thereof, R' is at least one member selected from the group consisting of alkylenes, cycloalkylenes, and arylenes having a total of 1 to 25 carbon atoms, R" is a hydrogen atom or R, and R is at least one member selected from the group consisting of alkyls having 1 to 5 carbon atoms, cycloalkyls and aryls.

Preferred dialysis membranes are those where Z is at least one member selected from the group consisting of tertiary aminos, carboxys, sulfos, and phosphonates.

Especially preferred dialysis membranes are those where Z is at least one member selected from the group consisting of dialkylaminoalkyls, carboxyalkyls, sulfoalkyls, sulfoaryls, phosphonate alkyls, and phosphonate aryls. The alkyl groups of Z comprise at least one member selected from the group consisting of ethyls and methyls.

Another especially preferred group is propyl silicate, which also produces novel dialysis membranes along with the other groups, as indicated above.

The modified celluloses can be produced by processes known from the literature. Houben Weyl's "Methoden der org. Chemie", Vol. 14, Pt. 2 (1963), pp. 868–898 or Ullmann's Encyklopadie der techn. Chemie, 4th ed. (1975), Vol. 9, pp. 200–212 can be cited here as examples.

Figure 1:
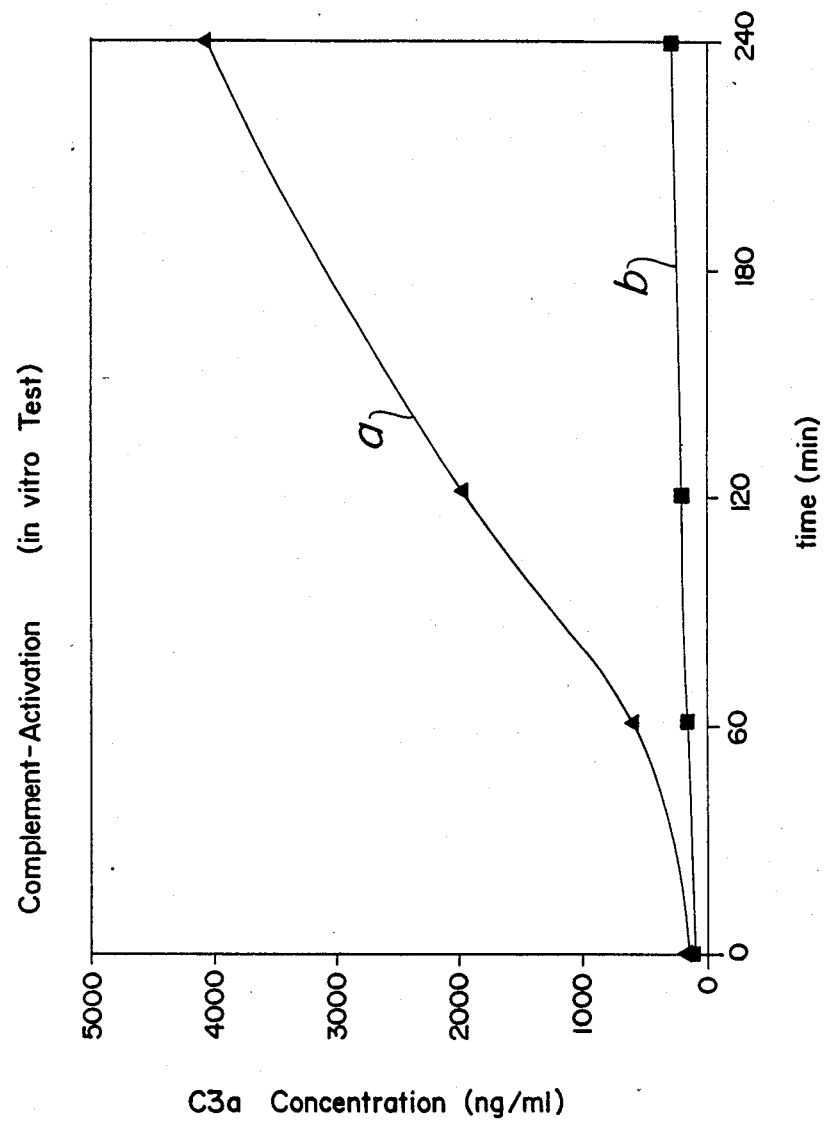
FIG. 1 is a graph of activated complement C$_3$a concentration vs. time, representing relative complement activation change, during an in-vitro test, for both a typical cellulose membrane (a) and one as presently claimed (b).

Complement activation was evaluated on the basis of the presence of C3a fragments within the scope of this invention. For this purpose, 300 ml of heparinized blood plasma was recirculated in vitro for 4 hours with a plasma flow rate of 200 ml/min through a dialyzer with a 1 m$^2$ effective exchange area. The presence of C3a fragments in plasma was determined by the radioimmunoassay method (Upjohn test). The relative complement activation for a particular test period was calculated as a percentage from the ratio of the concentration at sampling time to the initial value. The values obtained during the 4 hours of recirculation were used in the assessment. Such values are shown graphically in FIG. 1 according to their time lapse, i.e., curve (a) shows the result obtained with a typical cellulose membrane and curve (b) the result obtained with a membrane incorporating the invention, in which diethylaminoethyl cellulose, having a degree of substitution of 0.04, was used as the modified cellulose.

Figure 2:
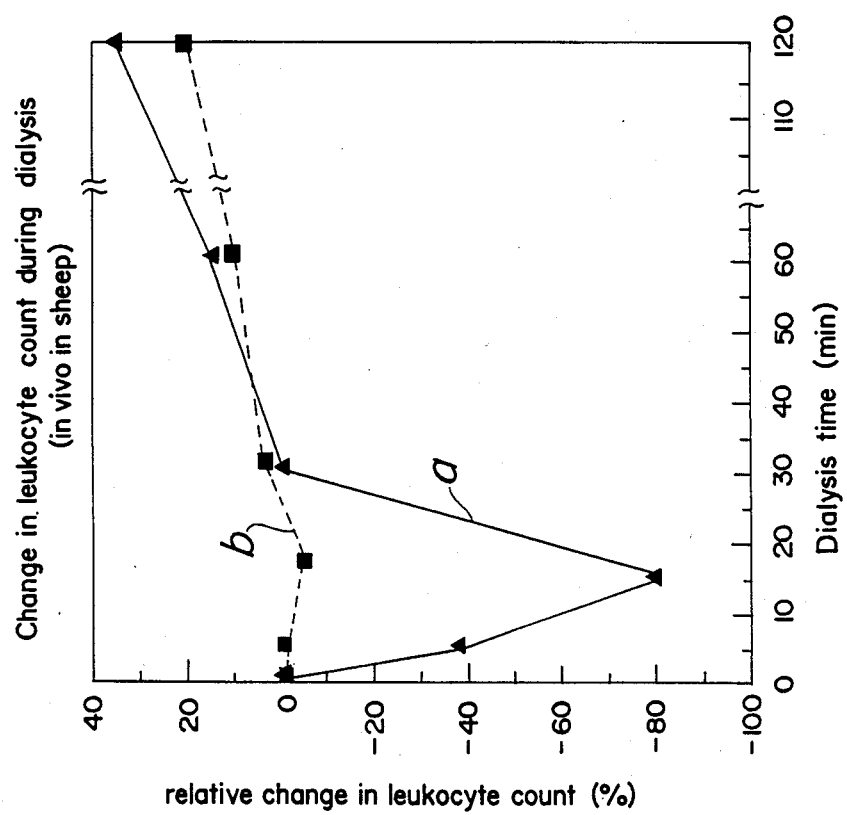
FIG. 2 is a graph of the relative leukocyte count (%) vs. dialysis time, during an in-vivo test, for both a typical cellulose membrane (a) and one as presently claimed (b).

Leukopenia was used as an additional measure of biocompatibility. It was determined in vivo in sheep within the scope of the present invention. Dialyzers with an effective exchange area of one square meter were used for this purpose. Blood flow rate was 200 ml/min. The leukocyte count was determined at specific time intervals for a total period of 2 hours. The percentage by which the leukocyte count changed at the particular test time in relation to the initial value was used for the evaluation. The values obtained in such a test are graphically shown in FIG. 2, i.e., curve (a) shows the result obtained with a typical cellulose membrane and curve (b) the results obtained with a membrane of the invention, in which diethylaminoethylcellulose, having a degree of substitution of 0.04, was as the modified cellulose. The value at the minimum point on the curve was used for the evaluation.

Additionally, for purposes of comparison, a numerical value for the degree of blood coagulation occurring for any given cellulose membrane was determined based upon the percentage increase in pressure across the membrane after 2 hours.

An index of intolerance was devised to combine these three parameters for an assessment of biocompatibility of the membrane. If the numerical value of complement activation is denoted by K, the numerical value for leukopenia by L, and the numerical value for blood coagulation by C, then the intolerance index (II) is calculated by the following formula:

$$II = 0.1 \times K - L + C$$

wherein K is further defined as the percentage increase in C$_{3a}$ or C$_{5a}$ fragment concentration from time t=0 to a time t, L is further defined as the percentage decrease in the number of leukocytes (as a negative number) from time t=0 to a time t, and C is further defined as a percentage increase in pressure across the dialysis membrane from time t=0 to a time t. A lower numerical value for the intolerance index II indicates a superior biocompatibility.

Since the indicated methods are very cmplex and it was established experimentally that conclusions on total efficacy could be reached from simplified in-vitro measurements, such simplified methods as those described below were utilized in part to confirm the invention.

A film of 150 micrometers thick of an 8% cellulose cuprammonium solution was stretched on a glass plate. A membrane 13 micrometers thick was obtained after precipitation in a NaOH solution (5%), decopperizing in sulfuric acid baths, immersion in an alcohol/glycerol solution, and subsequent drying by stretching over a beaker with a 15-cm diameter. Disks with a 5-cm diameter were subsequently cut from this membrane.

A membrane disk was then initially washed with a physiologic saline solution in a polystyrene tissue culture dish (Falcon, Becton & Dickinson) After the saline solution was poured out, 8 ml of human blood anticoagulated with 5 IU heparin/ml were added.

Incubation was performed in a covered tissue culture dish on a Desaga shaker at 37° C. for a period of 1 hour in an incubator aerated with 5% $CO_2$. As a control, 8 ml of human blood was incubated in a separate tissue culture dish without a membrane.

The concentration of the complement component C3a was 4300 ng/ml in the dish with the cellulose membrane and 580 ng/ml in the control experiment.

The platelet count was determined at the beginning and end of the experiment with a ZBI* Coulter counter to study the effect on coagulation. In the case of the cellulose membrane, 90% of the platelets were still present after 1 hour of incubation. A value of 95% was obtained in the control.

*ZBI = Zentraverband Berufsstandiger Ingenieurvereine = Federation of Professional Engineer Associations.

The invention will now be described in greater detail in the following examples:

EXAMPLE 1

As described above with reference to the simplified test methods, a flat membrane of carboxylmethylcellulose was produced. The degree of substitution was 0.06. Membranes with a 5-cm diameter were likewise used in the incubation test. After an incubation period of 1 hour, the C3a, concentration was 1350 ng/ml, representing 31% of the value for the pure cellulose membrane. The platelet count after 1 hour of incubation was still 87% of the initial value and thus corresponded essentially to that of the cellulose membranes.

EXAMPLE 2

As in Example 1, a membrane of sulfoethylcellulose was produced. The degree of substitution was 0.06. An appropriate flat membrane with a 5-cm diameter was incubated as in Example 1. After 1 hour, the C3a concentration was 1150 ng/ml, representing 27% of the value for the pure cellulose membrane. The platelet count was 89% of the initial value and thus almost equal to that of cellulose membranes.

EXAMPLE 3

As in Example 1, a membrane of modified cellulose was produced, which contained both diethylaminoethylcellulose and sulfoethylcellulose in a 3:1 ratio. The average degree of subsitution was 0.05. After incubation with fresh human blood as in Example 1, a C3a concentration of 975 ng/ml was obtained, which represented 23% of the value for the pure cellulose membrane. The platelet count in this case was 80% of the initial value and was thus somewhat lower than for cellulose membranes.

EXAMPLE 4

To produce dialysis membranes for comparison of the effects on biocompatibility of different degrees of substitution, a cuoxam solution (A), which contains 9 wt% of diethylaminoethyl cellulose having an average degree of substitution of 0.4, was used. A cuoxam solution (B) containing 9 wt.% cellulose (cotton linters) was mixed in such proportions with cuoxam solution (A) that the desired average degree of substitution (DS) is obtained. After filtration the cuoxam solutions (A) and (B) are added to a running mixer in the ratio provided to ensure homogeneous mixing. Mixtures were produced for this example as indicated in Table 1 below including the average degrees of substitution (DS) obtained in each case.

TABLE 1

| Test | Parts by Weight cuoxam solution (A) | Parts by Weight cuoxam solution (B) | Degree of substitution (DS) |
| --- | --- | --- | --- |
| a | 0 | 1 | 0 |
| b | 1 | 40 | 0.01 |
| c | 1 | 15 | 0.026 |
| d | 1 | 10 | 0.04 |
| e | 1 | 7.3 | 0.055 |
| f | 1 | 5 | 0.08 |
| g | 1 | 4 | 0.1 |

Mixtures a–g listed in Table 1 were fed into the ring-shaped slit of a tubular-thread spinnerete with a central bore for a cavity-forming liquid, extruded together with isopropyl myristate as the cavity-forming liquid, and coagulated in a typical precipitation bath. The resulting tubular threads were washed by a method well-known for the cuprammonium process, then dried and wound.

Dialyzers were produced with the resulting threads and the biocompatibility thereof studied. The findings are summarized in Table 2. It is clear, in this case, that tests c, d and e using the novel dialysis membranes have a clearly lower intolerance index than the comparison tests a, b, f and g, and thus exhibiting the desired biocompatibility.

TABLE 2

| Parameters | a | b | c | d | e | f | g |
| --- | --- | --- | --- | --- | --- | --- | --- |
| C3a (%) | 2500 | 2300 | 500 | 200 | 180 | 150 | 150 |
| Leukocytes (%) | −80 | −70 | −10 | −5 | −5 | −5 | −5 |
| Increase in pressure (%) | 40 | 35 | 50 | 60 | 90 | 400 | 500 |
| Intolerance Index II | 370 | 335 | 110 | 85 | 113 | 420 | 520 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A dialysis membrane for use in hemodialysis, having a structure comprised of flat films, blown films or tubular threads of substitution modified cellulose, said substitution modified cellulose having a structure represented by the formula:

$$\text{cellulose} - Z$$

wherein;

Z represents the group —R′—X—Y;

R′ is at least one member selected from the group consisting of alkylenes, cycloalkylenes and arylenes having a total of 1 to 25 carbon atoms;

X is at least one member selected from the group consisting of

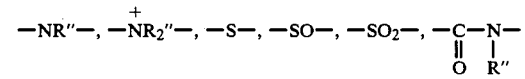

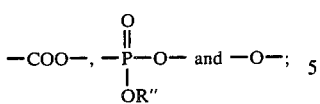

Y is at least one member selected from the group consisting of

—R,

—NR$_2$,

—Si(OR″)$_3$,

—SO$_3$H,

—COOH,

PO$_3$H$_2$,

—N+HR$_2$,

—OR″ and any salts thereof;

R″ is a hydrogen atom or R′ and R is at least one member selected from the group consisting of alkyls having 1 to 5 carbon atoms, cycloalkyls and aryls, and wherein the average degree of substitution of said modified cellulose is 0.02 to 0.07.

2. A dialysis membrane according to claim 1, wherein Z is at least one member selected from the group consisting of tertiary aminos, carboxyls, sulfos and phosphates.

3. A dialysis membrane according to claim 2, wherein Z comprises at least one alkyl selected from the group consisting of ethyls and methyls.

4. A dialysis membrane according to claim 2, wherein Z is at least one member selected from the group consisting of dialkylaminoalkyls, carboxyalkyls, sulfoalkyls, sulfoaryls, phosphonate alkyls and phosphonate aryls.

5. A dialysis membrane according to claim 4, wherein Z comprises at least one alkyl selected from the group consisting of ethyls and methyls.

6. A dialysis membrane according to claim 1, wherein Z is propyl silicate.

7. A dialysis membrane according to claim 1, wherein Z comprises at least one alkyl selected from the group consisting of ethyls and methyls.

* * * * *

UNITED STATES PATENT AND TRADEMARK OFFICE
CERTIFICATE OF CORRECTION

PATENT NO. : 4,668,396

DATED : May 26, 1987

INVENTOR(S) : Ulrich BAURMEISTER et al

It is certified that error appears in the above-identified patent and that said Letters Patent is hereby corrected as shown below:

Column 2, line 26, change "symptons" to --symptoms--.

Column 3, line 44, change "carboxys," to --carboxyls,--.

Column 4, line 46, change "$C_{3a}$ or $C_{5a}$" to --C3a or C5a--;

line 55, change "cmplex" to --complex--.

Column 5, line 3, change "Dickinson)" to --Dickinson).--;

line 50, change "subsitution" to --substitution--.

Column 7, line 22, in Claim 1, change "$-N+HR_2$," to -- $-\overset{+}{N}HR_2$,--.

Signed and Sealed this

Twenty-ninth Day of September, 1987

Attest:

DONALD J. QUIGG

Attesting Officer     Commissioner of Patents and Trademarks